(12) United States Patent
Pompili et al.

(10) Patent No.: US 10,525,804 B2
(45) Date of Patent: Jan. 7, 2020

(54) AUTOMATED RIGID TONNEAU COVER

(71) Applicant: BOS Automotive Products, Inc., Rochester Hills, MI (US)

(72) Inventors: William P. Pompili, Shelby Township, MI (US); Michael David Uhazie, Oakland Township, MI (US); Edwin Joseph Steinmetz, Lapeer, MI (US); Jürgen Josef Salewski, Rochester Hills, MI (US)

(73) Assignee: BOS Automotive Products, Inc., Rochester Hills, MI (US)

( * ) Notice: Subject to any disclaimer, the term of this patent is extended or adjusted under 35 U.S.C. 154(b) by 0 days.

(21) Appl. No.: 16/293,156

(22) Filed: Mar. 5, 2019

(65) Prior Publication Data

US 2019/0193536 A1 Jun. 27, 2019

Related U.S. Application Data

(63) Continuation of application No. PCT/US2018/019460, filed on Feb. 23, 2018.

(Continued)

(51) Int. Cl.
*B60J 7/14* (2006.01)
*B60P 7/02* (2006.01)
(Continued)

(52) U.S. Cl.
CPC .............. *B60J 7/141* (2013.01); *B60J 7/041* (2013.01); *B60J 7/0573* (2013.01); *B60J 7/198* (2013.01); *B60P 7/02* (2013.01); *B60R 5/048* (2013.01)

(58) Field of Classification Search
CPC ....... B60J 7/02; B60J 7/028; B60J 7/04; B60J 7/041; B60J 7/0573; B60J 7/14;
(Continued)

(56) References Cited

U.S. PATENT DOCUMENTS 1,627,716 A 5/1927 Teachout
1,718,183 A 6/1929 Smith
(Continued)

FOREIGN PATENT DOCUMENTS

EP 0427677 A1 5/1991
EP 0834414 A2 4/1998
(Continued)

OTHER PUBLICATIONS

Non-Final Office Action from U.S. Appl. No. 15/013,352, filed Feb. 2, 2016.

(Continued)

*Primary Examiner* — Jason S Daniels
(74) *Attorney, Agent, or Firm* — Carlson, Gaskey & Olds, P.C.

(57) ABSTRACT

A retractable cover system includes laterally spaced apart guide rails that each provide a track. A drive assembly includes a motor operatively connected to a gear. A cover has multiple slats configured to interlock with one another in a deployed configuration. The slats cooperate with the gear and are slidable in the tracks between first and second positions within the opening in response to actuation of the drive system. The slats are stacked onto one another in a stowed configuration. A method of servicing a retractable cover system includes the step of removing an access cover from a magazine to expose a cavity housing stacked rigid slats. A method of retracting a tonneau cover includes the steps of actuating a handle and decoupling the tonneau cover from a drive mechanism.

15 Claims, 13 Drawing Sheets

Related U.S. Application Data

(60) Provisional application No. 62/462,971, filed on Feb. 24, 2017, provisional application No. 62/491,055, filed on Apr. 27, 2017, provisional application No. 62/526,872, filed on Jun. 29, 2017.

(51) Int. Cl.
*B60R 5/04* (2006.01)
*B60J 7/19* (2006.01)
*B60J 7/04* (2006.01)
*B60J 7/057* (2006.01)

(58) Field of Classification Search
CPC ... B60J 7/141; B60J 7/198; B60P 7/02; B60R 5/048
USPC ............ 296/100.02, 100.03, 100.05, 100.06, 296/100.09
See application file for complete search history.

(56) References Cited

U.S. PATENT DOCUMENTS

| | | | |
|---|---|---|---|
| 1,969,595 A | 8/1934 | D'Ornellas | |
| 3,488,087 A | 1/1970 | Cox | |
| 4,210,361 A | 7/1980 | Marvin et al. | |
| 4,518,194 A | 5/1985 | Kirkham et al. | |
| 4,563,034 A | 1/1986 | Lamb | |
| 4,611,848 A | 9/1986 | Romano | |
| 4,634,172 A | 1/1987 | Duda | |
| 4,786,099 A | 11/1988 | Mount | |
| 4,792,178 A | 12/1988 | Kokx | |
| 4,795,206 A * | 1/1989 | Adams .................. B60J 5/14 160/201 | |
| 4,889,381 A | 12/1989 | Tamblyn et al. | |
| 4,923,240 A | 5/1990 | Swanson | |
| 5,040,843 A | 8/1991 | Russell et al. | |
| 5,096,250 A | 5/1992 | Menz | |
| 5,121,960 A | 6/1992 | Wheatley | |
| 5,301,995 A | 4/1994 | Isler | |
| 5,330,246 A | 7/1994 | Bernardo | |
| 5,375,900 A | 12/1994 | Tessenyi et al. | |
| 5,758,921 A | 6/1998 | Hall | |
| 5,909,921 A | 6/1999 | Nesbeth | |
| 6,000,740 A | 12/1999 | Hall et al. | |
| 6,030,021 A | 2/2000 | Ronai | |
| 6,053,556 A | 4/2000 | Webb | |
| 6,126,226 A | 10/2000 | Wheatley | |
| 6,217,102 B1 | 4/2001 | Lathers | |
| 6,224,138 B1 | 5/2001 | Adsit et al. | |
| 6,234,561 B1 | 5/2001 | Huotari | |
| 6,276,735 B1 | 8/2001 | Champion | |
| 6,309,005 B1 | 10/2001 | Priest et al. | |
| 6,315,346 B1 | 11/2001 | Martin | |
| 6,322,129 B2 | 11/2001 | Huotari | |
| 6,416,103 B1 | 7/2002 | Laudenbach et al. | |
| 6,527,331 B2 | 3/2003 | Searfoss | |
| 6,568,739 B1 | 5/2003 | Burch | |
| 6,582,007 B2 | 6/2003 | Gothier et al. | |
| 6,623,062 B1 | 9/2003 | Hoffman | |
| 6,719,353 B1 | 4/2004 | Isler et al. | |
| 6,830,281 B2 | 12/2004 | Hoffman | |
| 6,846,032 B2 | 1/2005 | de Gaillard et al. | |
| 6,893,072 B1 | 5/2005 | Graves | |
| 6,929,303 B1 | 8/2005 | Sharples | |
| 6,948,760 B2 | 9/2005 | Marx et al. | |
| 7,275,779 B2 | 10/2007 | Hebron | |
| 7,384,090 B1 | 6/2008 | Weldy | |
| 7,445,264 B2 | 11/2008 | Spencer et al. | |
| 7,513,562 B2 | 4/2009 | Hardy et al. | |
| 7,530,614 B2 | 5/2009 | Nichols | |
| 7,568,752 B1 | 8/2009 | Lin | |
| 7,815,239 B1 | 10/2010 | Schmeichel et al. | |
| 7,946,643 B2 | 5/2011 | Getschel et al. | |
| 8,100,615 B1 | 1/2012 | Freeborn | |
| 8,186,739 B2 | 5/2012 | Bruestle et al. | |
| 8,308,218 B2 | 11/2012 | Kneifl et al. | |
| 8,424,951 B1 | 4/2013 | Martin | |
| 8,523,266 B2 | 9/2013 | Yue | |
| 8,657,358 B2 | 2/2014 | Garska | |
| 8,672,388 B2 | 3/2014 | Rusher et al. | |
| 8,702,151 B2 | 4/2014 | Mayfield et al. | |
| 8,746,321 B2 | 6/2014 | Miller | |
| 8,777,293 B2 | 7/2014 | Garska | |
| 8,807,624 B2 | 8/2014 | Garska | |
| 8,807,625 B2 | 8/2014 | Garska | |
| 8,939,494 B2 | 1/2015 | Maimin et al. | |
| 9,004,571 B1 | 4/2015 | Bernardo et al. | |
| 9,266,416 B1 | 2/2016 | Nania | |
| 2004/0212212 A1 | 10/2004 | Spencer et al. | |
| 2005/0205221 A1 | 9/2005 | Miller | |
| 2007/0056696 A1 | 3/2007 | Lin | |
| 2007/0175603 A1 | 8/2007 | Lin | |
| 2008/0006373 A1 | 1/2008 | Lin | |
| 2008/0211266 A1 | 9/2008 | Bergmiller et al. | |
| 2008/0289776 A1 | 11/2008 | Starzmann et al. | |
| 2010/0148540 A1 | 6/2010 | Hotta et al. | |
| 2011/0232851 A1 | 9/2011 | Uehara et al. | |
| 2012/0048489 A1 | 3/2012 | Oh et al. | |
| 2012/0049568 A1 | 3/2012 | Wolf et al. | |
| 2012/0255690 A1 | 10/2012 | Zeo et al. | |
| 2012/0274093 A1 | 11/2012 | Yue | |
| 2013/0204461 A1 | 8/2013 | Kartes | |
| 2013/0341954 A1 | 12/2013 | Maimin et al. | |
| 2013/0341955 A1 | 12/2013 | Garska | |
| 2013/0341956 A1 | 12/2013 | Garska | |
| 2013/0341957 A1 | 12/2013 | Garska | |
| 2013/0341958 A1 | 12/2013 | Mayfield et al. | |
| 2013/0341959 A1 | 12/2013 | Garska | |
| 2013/0341960 A1 | 12/2013 | Garska | |
| 2014/0252794 A1 | 9/2014 | Aho et al. | |
| 2016/0236549 A1 | 8/2016 | Stewart et al. | |
| 2016/0236552 A1 | 8/2016 | Hannan et al. | |
| 2016/0236554 A1 | 8/2016 | Stewart et al. | |
| 2016/0280123 A1 | 9/2016 | Rohr et al. | |

FOREIGN PATENT DOCUMENTS

| | | | |
|---|---|---|---|
| EP | 2221429 A2 | 8/2010 | |
| FR | 2527465 A1 | 12/1983 | |
| FR | 2604203 A2 | 3/1988 | |
| JP | 2011051528 | 3/2011 | |
| WO | 2007082091 | 7/2007 | |

OTHER PUBLICATIONS

Non-Final Office Action from U.S. Appl. No. 15/013,363, filed Feb. 2, 2016.
Non-Final Office Action from U.S. Appl. No. 15/013,369, filed Feb. 2, 2016.
Final Office Action from U.S. Appl. No. 15/013,369, filed Feb. 2, 2016.
Non-Final Office Action from U.S. Appl. No. 15/042,374, filed Feb. 12, 2016.
Non-Final Office Action from U.S. Appl. No. 15/042,358, filed Feb. 12, 2016.
Non-Final Office Action from U.S. Appl. No. 15/042,383, filed Feb. 12, 2016.
Notice of Allowance from U.S. Appl. No. 15/042,383, filed Feb. 12, 2016.
Notice of Allowance from U.S. Appl. No. 15/042,358, filed Feb. 12, 2016.
Notice of Allowance from U.S. Appl. No. 15/042,374, filed Feb. 12, 2016.
International Search Report and Written Opinion for International Application No. PCT/US18/19460 dated Jul. 3, 2018.
International Preliminary Report on Patentability for International Application No. PCT/US2018/019460 dated Sep. 6, 2019.

* cited by examiner

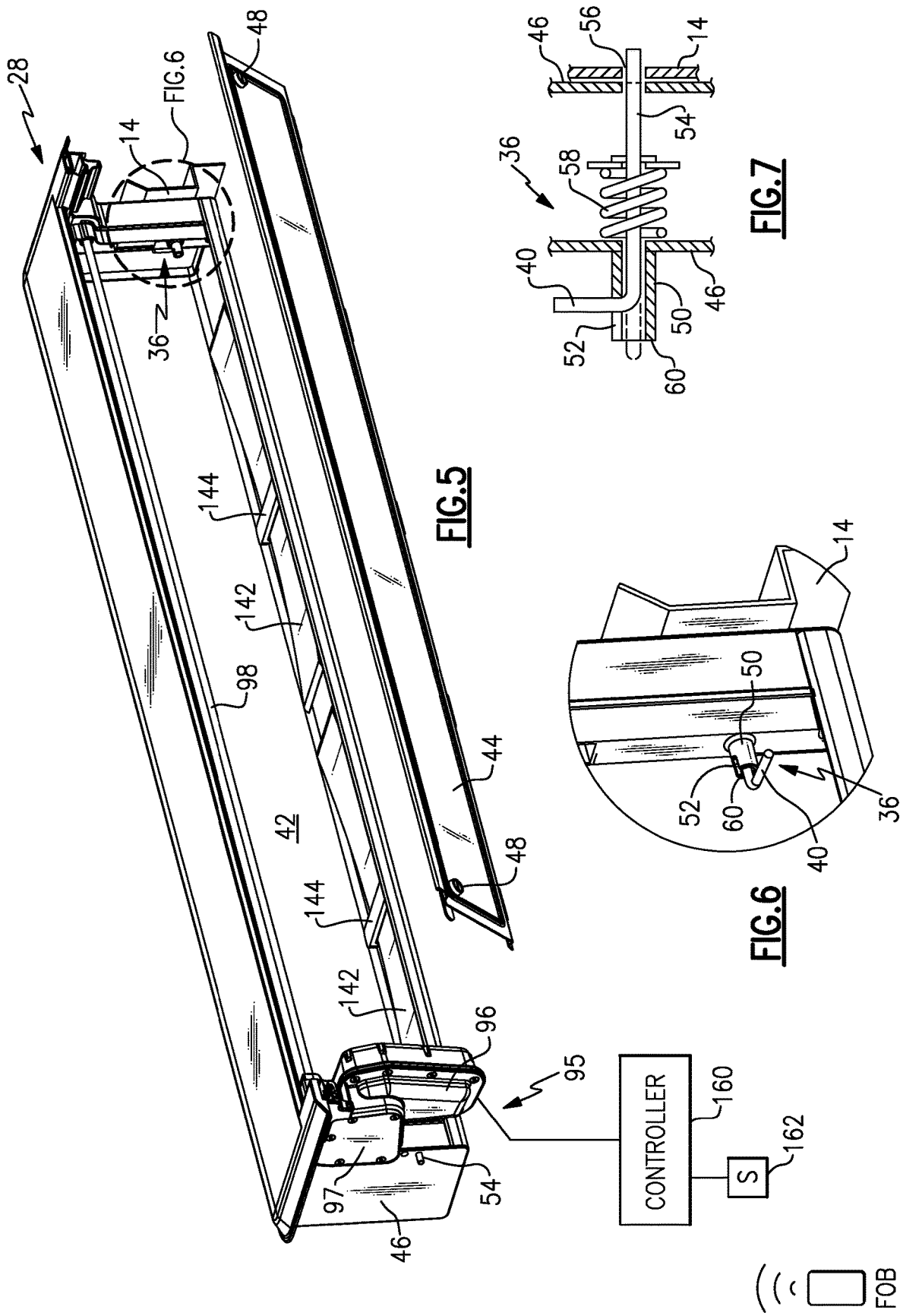

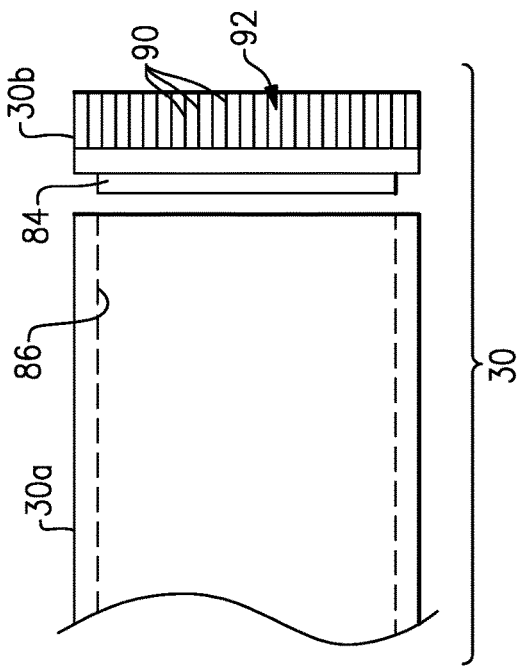
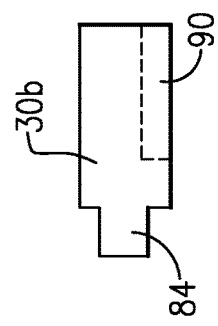
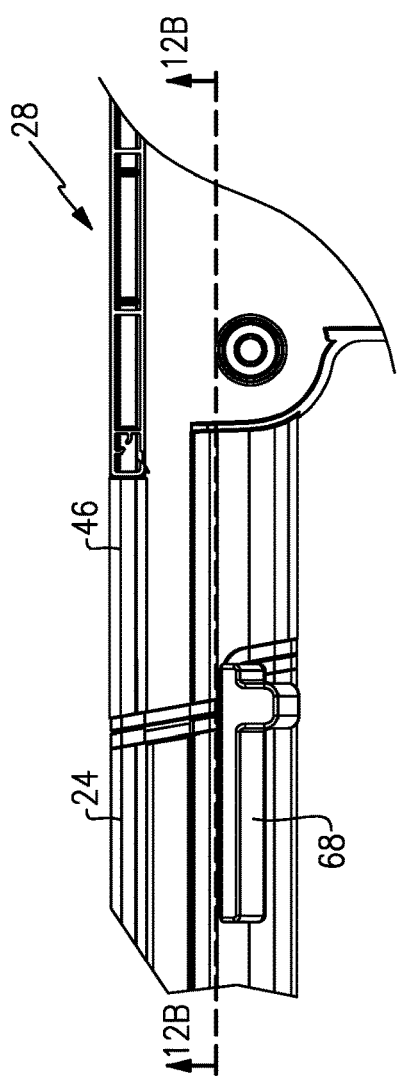
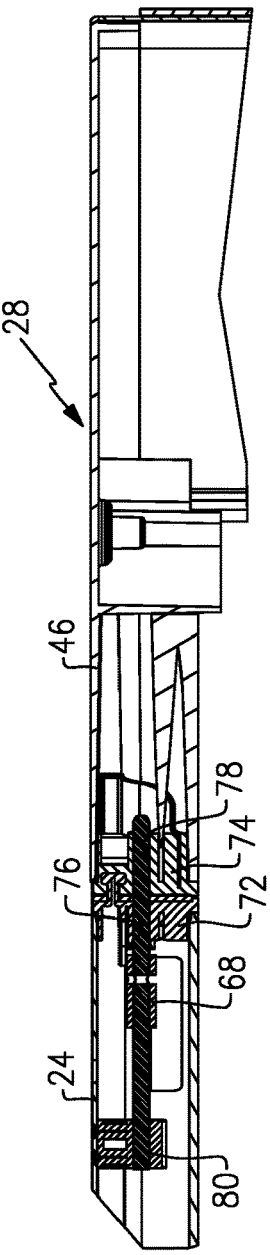

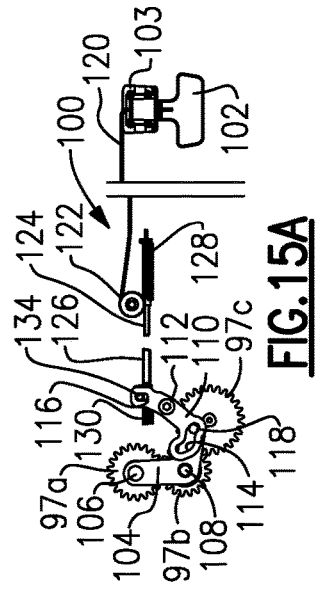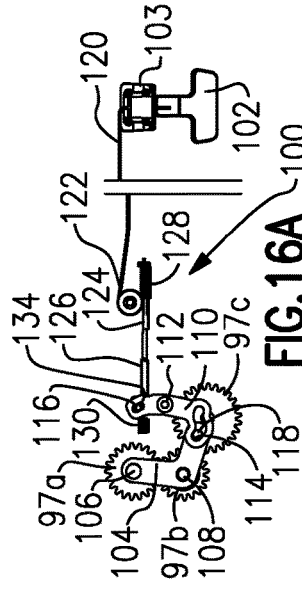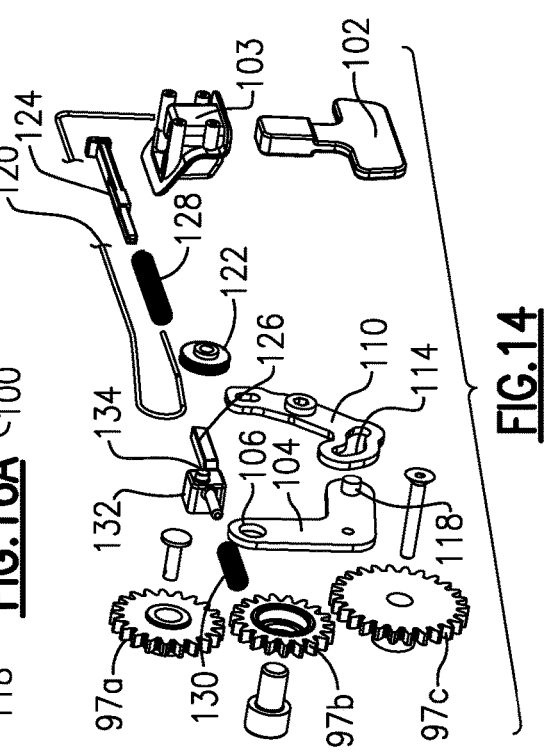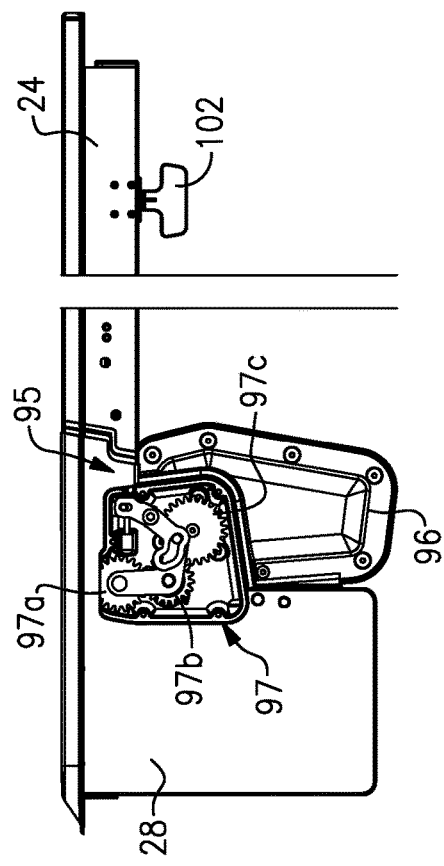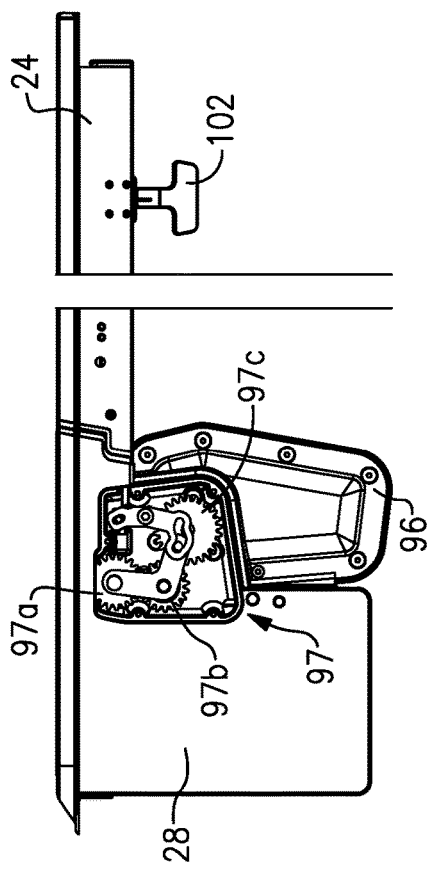

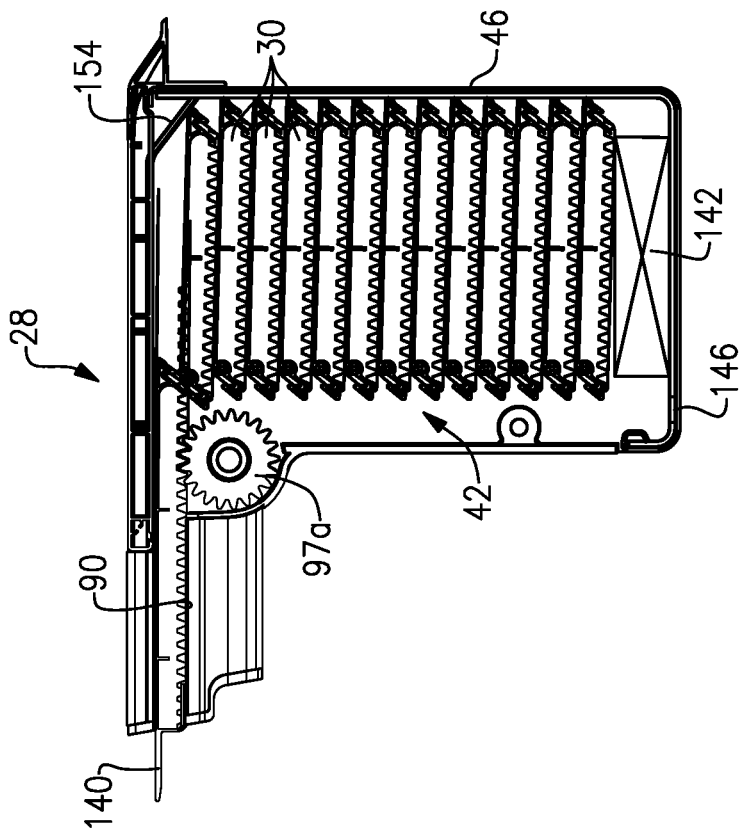
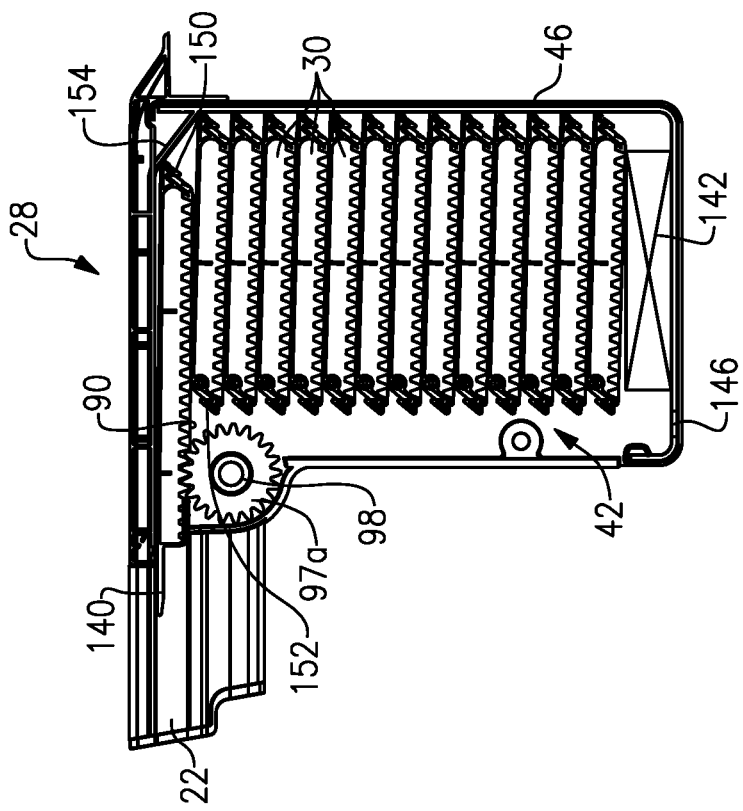

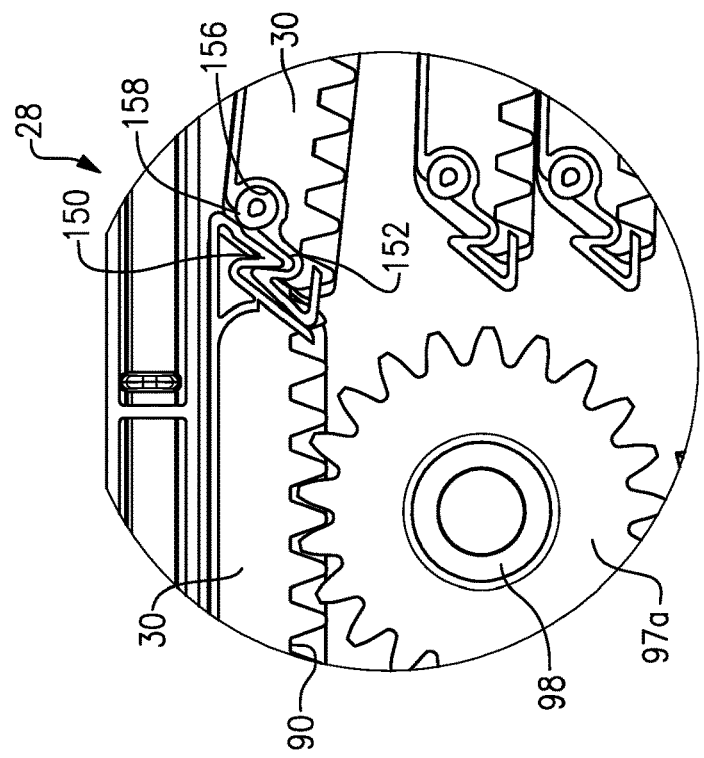
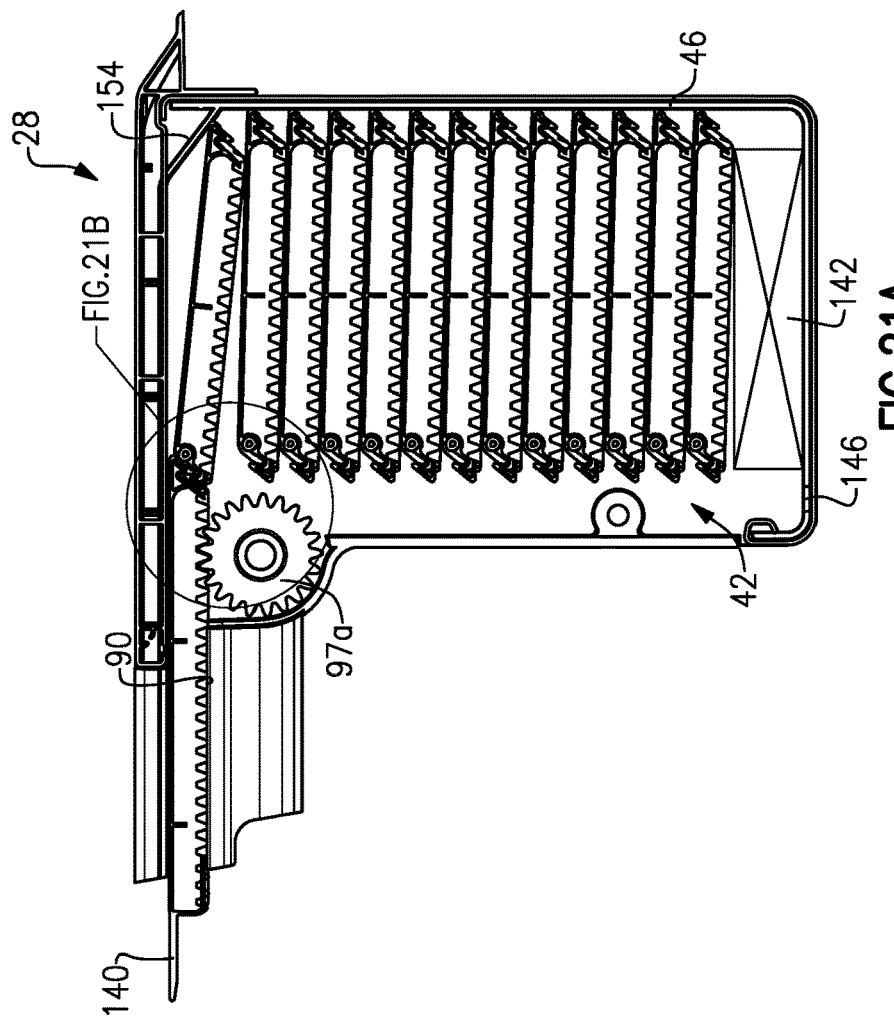

AUTOMATED RIGID TONNEAU COVER

CROSS-REFERENCE TO RELATED APPLICATIONS

This application is a continuation of International Application No. PCT/US18/19460 filed on Feb. 23, 2018, which claims priority to U.S. Provisional Application No. 62/462,971 filed on Feb. 24, 2017, U.S. Provisional Application No. 62/491,055 filed on Apr. 27, 2017, and U.S. Provisional Application No. 62/526,872, filed on Jun. 29, 2017, and all are incorporated herein by reference.

BACKGROUND

This disclosure relates to cover systems used, for example, as a tonneau cover of a pickup truck bed. The cover system may also be used, for example, as a roof, sunshade, load floor, or load space cover for vehicle applications, or for non-vehicle applications as well.

Tonneau covers are frequently used to enclose a pickup truck bed. Soft tonneau covers provide the advantage over hard covers of being able to be stowed in a relative small space when the cover is not in use. However, soft tonneau covers do not provide security when closed as the soft cover can be cut to gain access to the truck bed. Prior art hard covers have been heavy and bulky, occupying a significant portion of the truck bed. Moreover, solely manual hard covers are not a desirable option for many customers. What is needed is a motorized rigid tonneau cover that provides security, is compact, weather resistant and sufficiently robust to withstand common load conditions.

SUMMARY

In a featured embodiment, a retractable cover system includes laterally spaced apart guide rails each providing a track. A drive assembly includes a motor operatively connected to a gear. A cover has multiple slats configured to interlock with one another in a deployed configuration. The slats cooperate with the gear and slidable in the tracks between first and second positions within the opening in response to actuation of the drive system. The slats are stacked onto one another in a stowed configuration.

In another embodiment according to the previous embodiment, each slat includes an end with teeth that cooperate with the gear.

In another embodiment according to any of the previous embodiments, the teeth are arranged on an underside of the end.

In another embodiment according to any of the previous embodiments, the slats include laterally extending profiles that are complementary to one another and are configured to interlock with one another in a deployed configuration. The complementary profiles are configured to decouple from one another in the stowed position.

In another embodiment according to any of the previous embodiments, a magazine houses the slats in the stowed configuration. The magazine is configured to be arranged in a truck bed, and includes at least one of first and second locking mechanisms. The first locking mechanism is configured to selectively lock the magazine to the truck bed, and the second locking mechanism is configured to selectively lock the magazine to the guide rails.

In another embodiment according to any of the previous embodiments, a release mechanism cooperates with the drive assembly. The cover is configured to operate manually with the release mechanism in a disengaged position.

In another embodiment according to any of the previous embodiments, the release mechanism includes a handle operatively connected to a link that supports a first gear of the gear train. The release mechanism is configured to rotate the first gear out of engagement with a second gear in response to an input from the handle.

In another embodiment according to any of the previous embodiments, a magazine is configured to house multiple rigid slats in the retracted position. The release mechanism includes first and second rods respectively supported by the guide rail and the magazine. The first and second rods are spaced from one another during normal operation of the cover by the motor, and the first and second rods are configured to engage one another in response to the input.

In another embodiment according to any of the previous embodiments, the release mechanism includes an arm that rotatably cooperates with the link in response to translation of the second rod.

In another embodiment according to any of the previous embodiments, first and second springs respectively cooperate with the first and second rods to bias the rods apart from one another and the first and second gears into engagement during normal operation.

In another embodiment according to any of the previous embodiments, the magazine includes a floor supporting a spring biasing the slats upward toward the tracks.

In another embodiment according to any of the previous embodiments, the spring is a pair of leaf springs arranged between the floor and the bottommost slat.

In another featured embodiment, a method of servicing a retractable cover system includes removing an access cover from a magazine to expose a cavity housing stacked rigid slats. The removing step includes opening a lock on the magazine.

In another embodiment according to the previous embodiment, the step of releasing a first locking mechanism to decouple the magazine from a truck bed subsequent to the removing step is included. The magazine is lifted from the truck bed subsequent to the releasing step.

In another embodiment according to the previous embodiment, the step of releasing a second locking mechanism to decouple the magazine from laterally spaced apart guide rails mounted on a truck bed is included. The guide rails each provide a track along which the slats slide during operation.

In another featured embodiment, a method of retracting a tonneau cover includes actuating a handle, and decoupling the tonneau cover from a drive mechanism.

In another embodiment according to any of the previous embodiments, the handle actuating step includes pulling the handle out of a pocket and rotating the handle to maintain a release mechanism in a released position.

In another embodiment according to any of the previous embodiments, the decoupling step includes decoupling an electric motor from a gear.

In another embodiment according to any of the previous embodiments, the decoupling step includes rotating a first gear out of engagement with a second gear.

BRIEF DESCRIPTION OF THE DRAWINGS

The disclosure can be further understood by reference to the following detailed description when considered in connection with the accompanying drawings wherein:

FIG. 5 shows the magazine with an access cover displaced and slats removed for clarity.

FIG. 6 is an enlarged view of the first locking mechanism in a released position.

FIG. 7 is a cross-sectional view of the first locking mechanism in a locked position.

FIGS. 12A and 12B are perspective and cross-sectional views of the second locking mechanism in a locked position.

FIG. 13A is a partially broken, exploded bottom view of a slat.

FIG. 13B is an end view of a slat end.

FIG. 14 is an exploded view of a release mechanism, including a portion of the drive system.

FIGS. 15A-15C are views of the release mechanism in an automatic drive configuration.

FIGS. 16A-16C are views of the release mechanism in a manual drive configuration.

FIG. 17 is a cross-sectional view through the magazine illustrating the slats fully retracted and stowed.

FIG. 18 is a cross-sectional view through the magazine illustrating a first slat deployed.

FIGS. 21A and 21B are cross-sectional and enlarged cross-sectional views of a second slat being decoupled from the first slat during stowage.

DETAILED DESCRIPTION

This disclosure relates to a motorized, rigid cover system for use in a variety of applications. In one example, the cover system may be used as a tonneau cover to selectively provide access to a vehicle truck bed in both automated and manual modes of operation.

Figure 1:
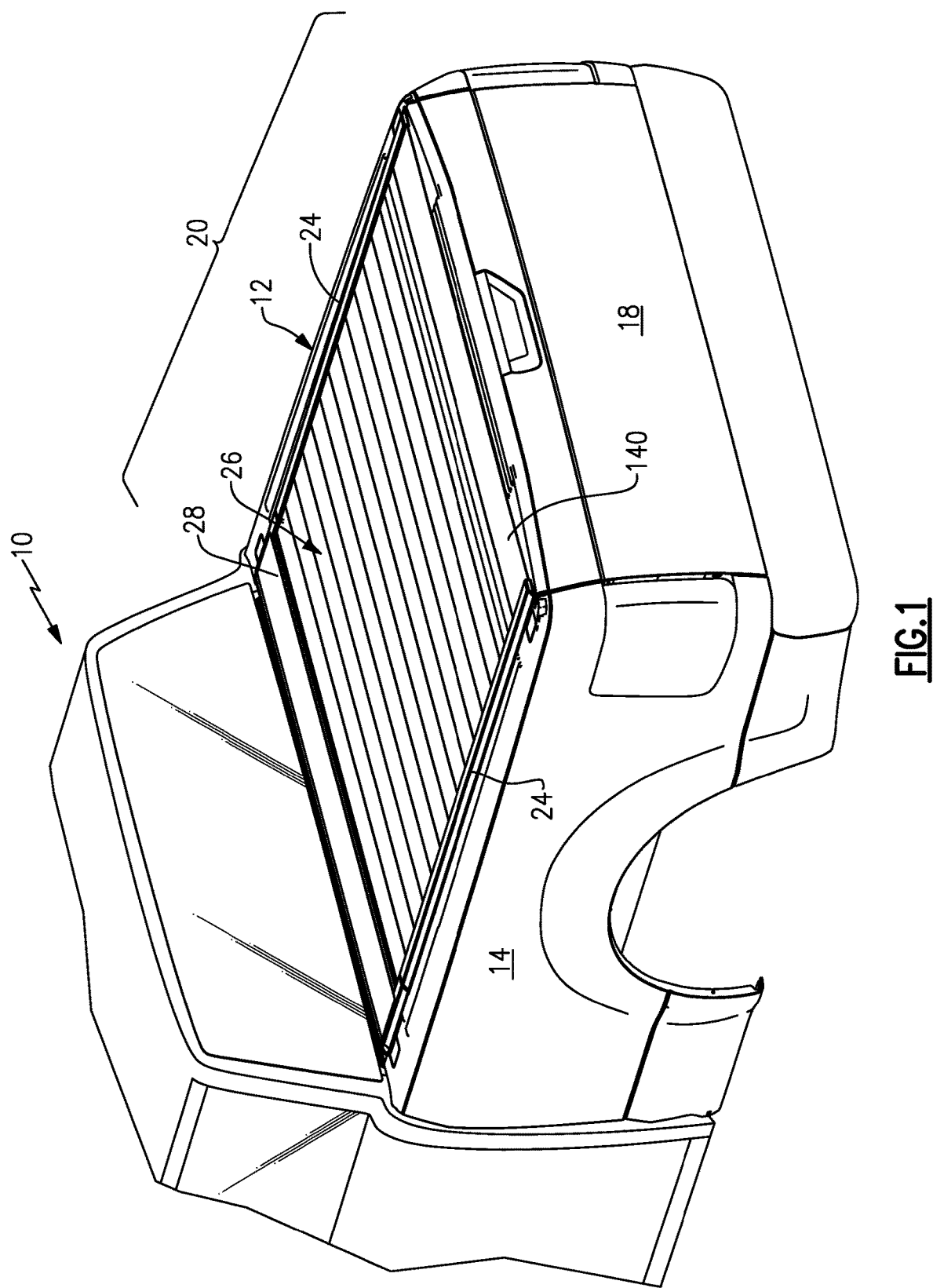
FIG. 1 illustrates a pickup truck with an example cover system having a rigid cover with multiple slats in a closed position with respect to a truck bed.
Figure 2:
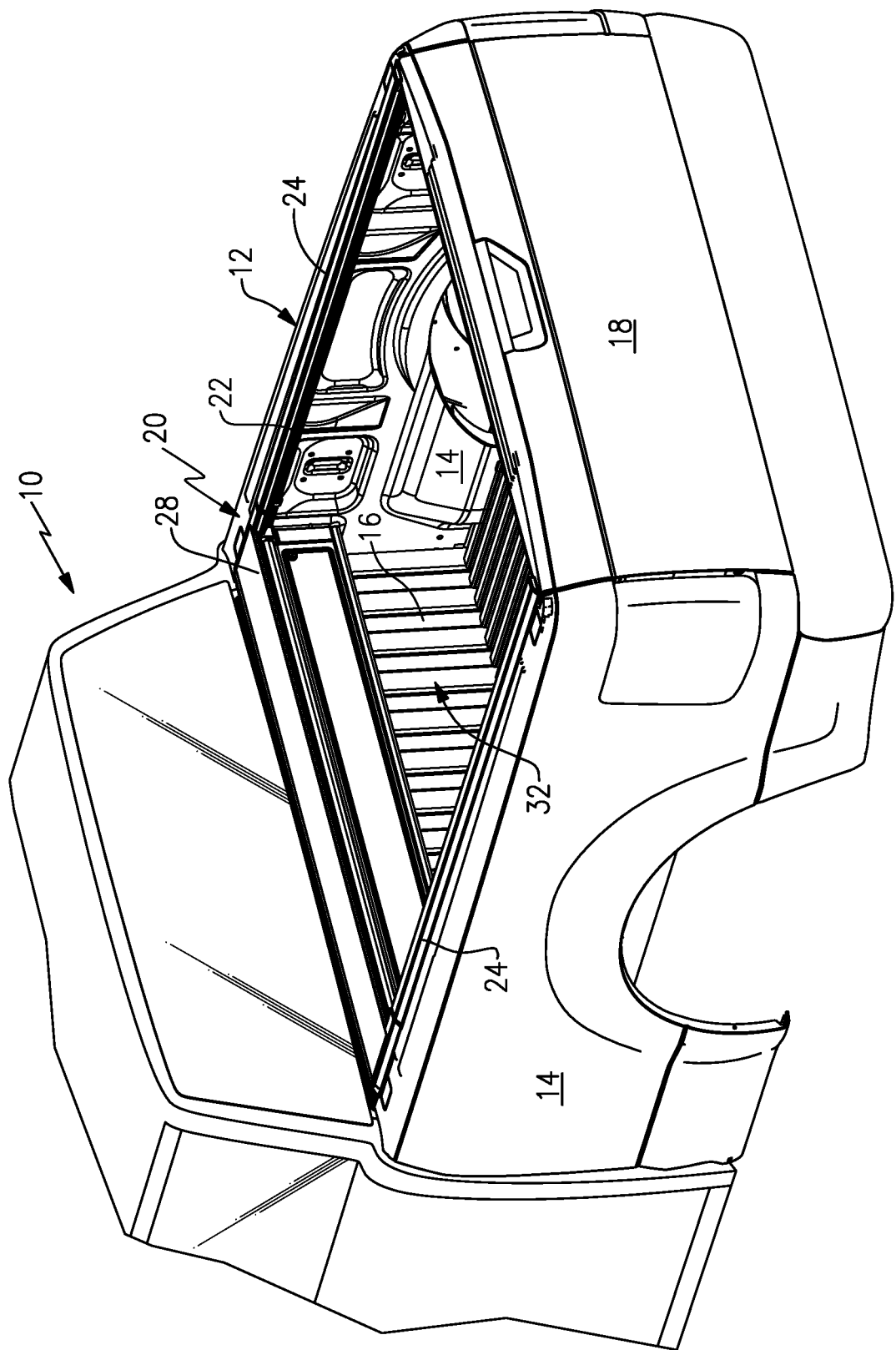
FIG. 2 depicts the cover of the cover system in an open position.
Figure 3:
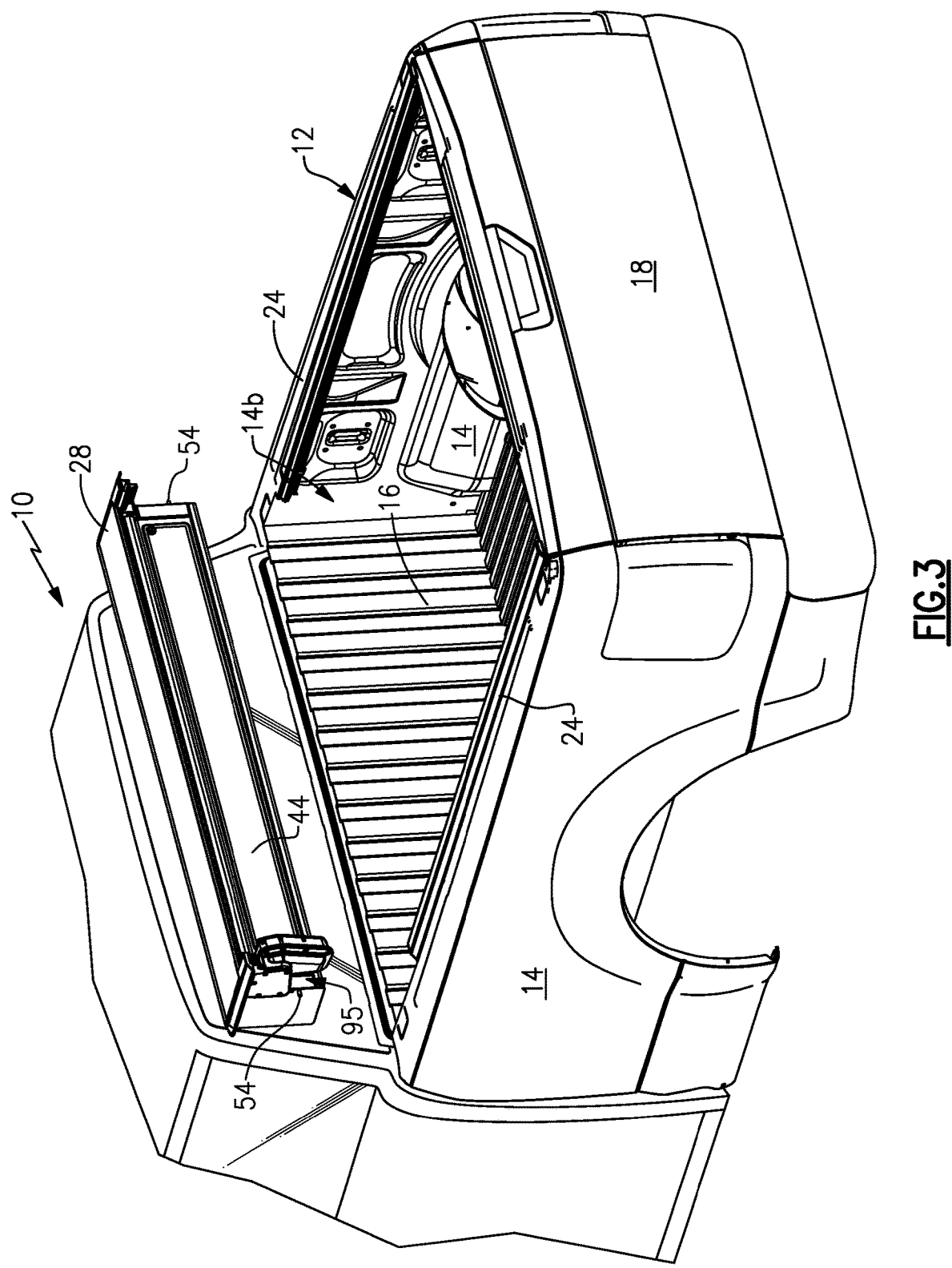
FIG. 3 illustrates removal of a cover system magazine from the truck bed.

A vehicle 10 is schematically illustrated in FIGS. 1-3. The vehicle 10 includes a truck bed 12 having lateral sides 14 and a front wall 16. A tailgate 18 is typically pivotally attached to a rear of the truck bed 12. A cover system 20 is mounted to the top of the truck bed 12 and has a rigid cover 26 that is moveable between a closed position (FIG. 1) and an open position (FIG. 2), including partially open positions in between. If desired, the cover system 20 can be moved between an infinite number of positions between the closed and open positions.

The cover system 20 includes a frame about the truck bed opening provided by laterally spaced apart guide rails 24, which may be provided by aluminum extrusions of various possible shapes. The guide rails 24 define a path alone which the cover 26 moves and are secured to the lateral sides 14 of the truck bed 12. The cover 26, or hard tonneau cover, which may be constructed from multiple interlocking slats 30, is supported by and can slide along tracks 22 within the guide rails 24. A drive assembly 95 slides the slats 30 between the open and closed positions along a path provided by the tracks 22 in an automated mode of operation. The slats 30 interlock with one another as the cover 26 is deployed over the truck bed. The slats 30 are decoupled from one another and stored within a magazine 28 when the cover 26 is retracted.

A magazine 28 is mounted near the front wall 16 and houses the slats 30 in a stacked relationship when the cover 26 is not fully deployed. The magazine 28 is spaced from the truck bed floor, which provides a space 32 that can accommodate cargo when the magazine 28 is installed in the truck bed 12. The magazine 28 is easily removable from the truck bed 12 to increase storage space. For simplicity, the cover system 20 is designed so that the guide rails 24 may remain secured to the truck bed 12 when the magazine 28 is removed. A first locking mechanism 36 (FIGS. 4-7) and a second locking mechanism 38 (FIGS. 10-12B) are used to secure and release the magazine 28 to and from the truck bed 12.

In the example shown in FIGS. 4-7, the magazine 28 is secured to a portion of the lateral sides 14 (one side shown). A handle 40 of the first locking mechanism 36 is accessible from the interior cavity 42 of the magazine 28 with an access panel 44 removed. The access panel 44 is secured to a housing 46 of the magazine 28 by locks 48. The access panel 44 may be removed from the magazine 28 so that the slats 30 and cavity 42 may be hosed off periodically.

Figure 4:
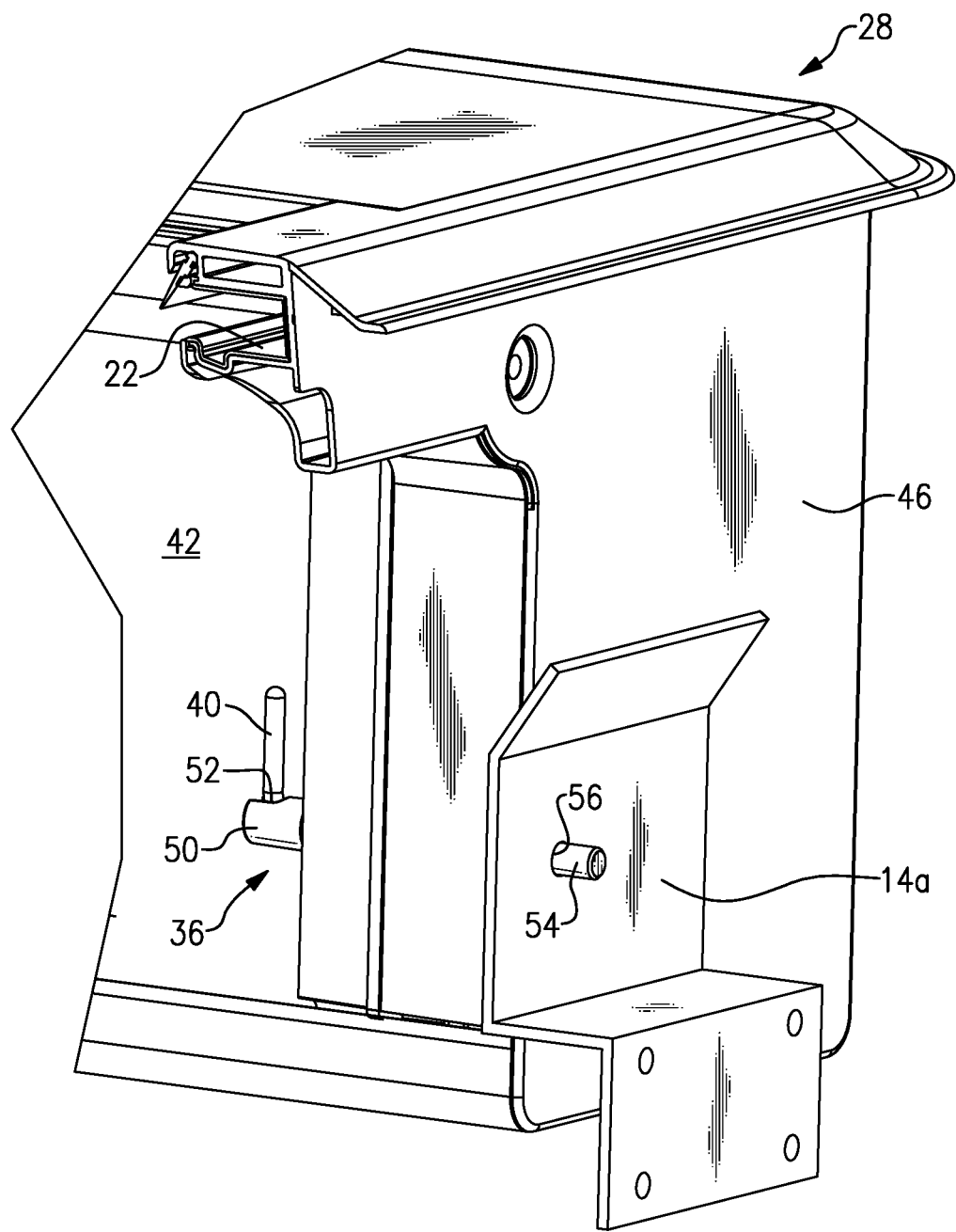
FIG. 4 shows a first locking mechanism securing the magazine to the truck bed.

The first locking mechanism 36 includes a boss 50 with a slot 52. The handle 40 is connected to a pin 54 that extends through the boss 50 and into a hole 56 in bracket 14a secured to the lateral side 14 when in a locked position (FIGS. 4, 5 and 7). The bracket 14a may be a separate structure secured, for example, where a hold down mount 14b (FIG. 3) would be optionally secured to the truck bed 12, or the bracket 14a may be integrated fully into the lateral side 14. A biasing spring 58 urges the pin 54 outward from the magazine 28, and the handle 40 is seated in the slot 52 in the locked position.

The first locking mechanism 36 is moved to a released position (FIG. 6; dashed lines in FIG. 7) by pulling the handle 40 inward, counteracting the biasing spring 58 and rotating the handle 40 such that the handle is misaligned with the slot 52. The biasing spring 58 seats the handle 40 in abutment with a terminal end 60 of the boss 50, maintaining the pin 54 in a retracted position with respect to the hole 56.

Figure 9:
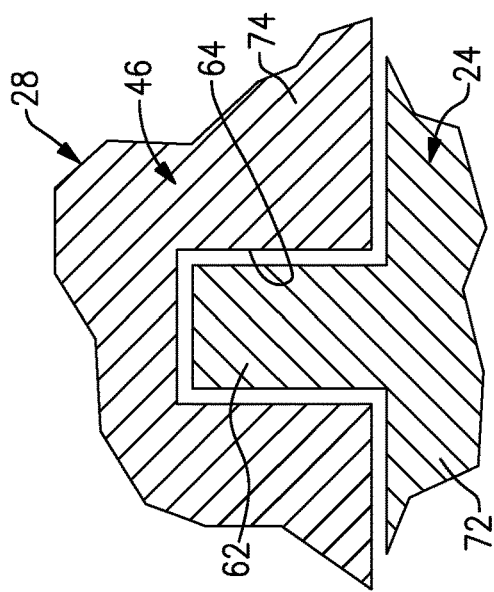
FIG. 9 is a cross-sectional view of the magazine seated on the magazine locator.
Figure 8:
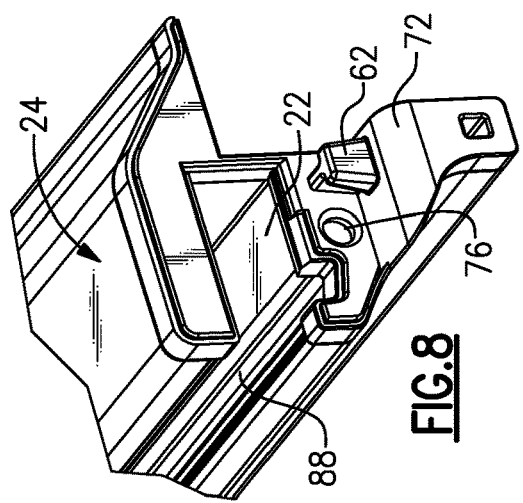
FIG. 8 is a perspective end view of a guide rail having a magazine locator.
Figure 10:
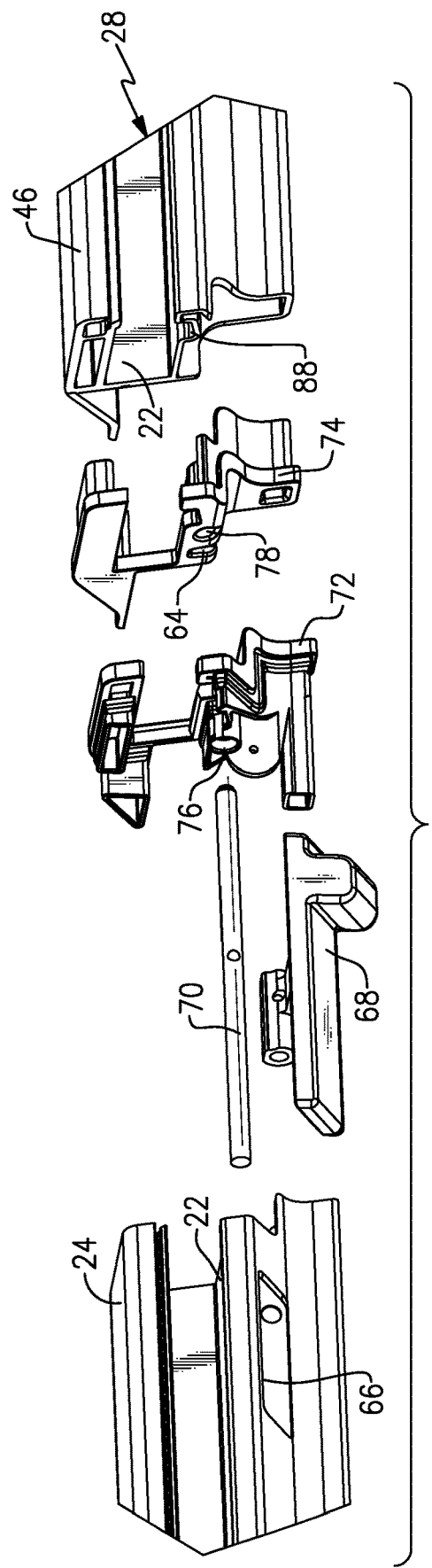
FIG. 10 is an exploded view of a second locking mechanism.
Figure 11A:
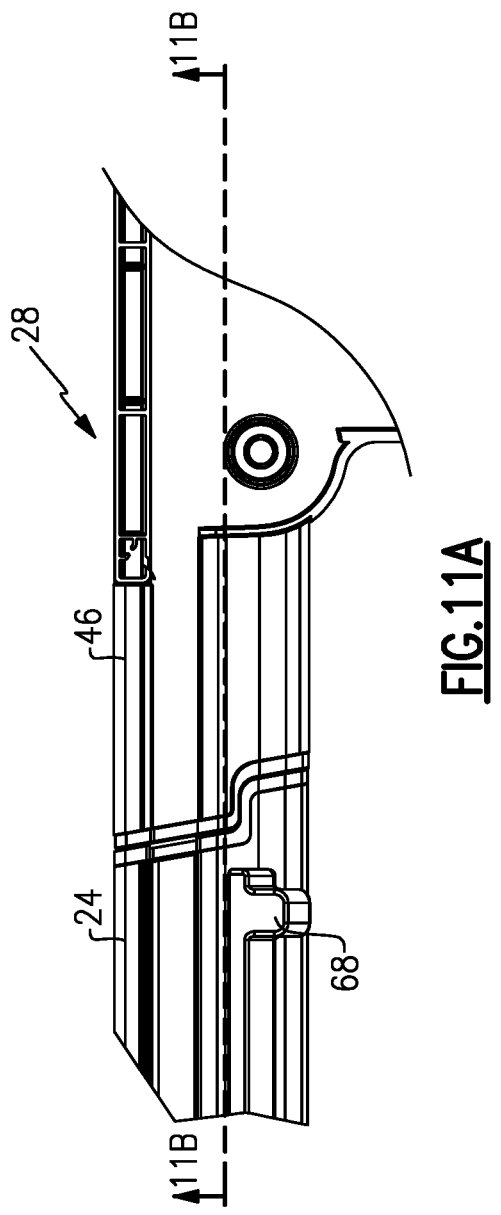
FIGS. 11A and 11B are perspective and cross-sectional views of the second locking mechanism in a released position.
Figure 11B:
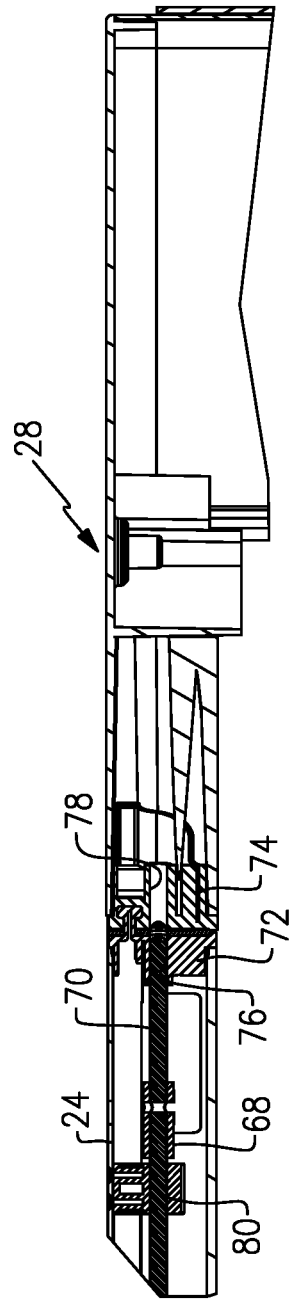
Figure 15C:
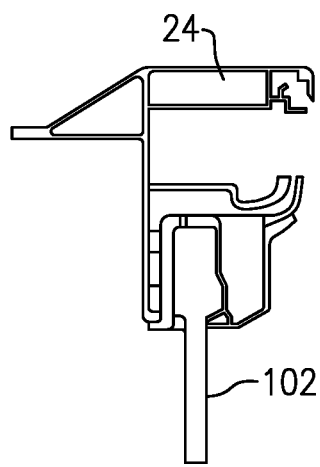
Figure 16C:
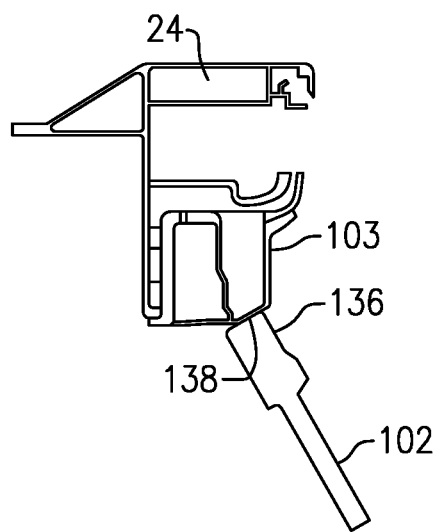
Figure 20:
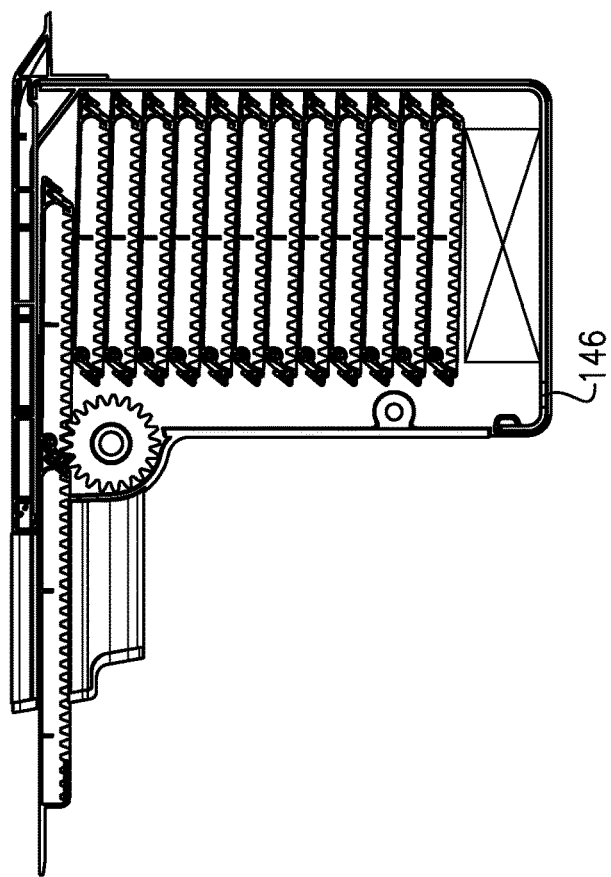
FIG. 20 is a cross-sectional view through the magazine illustrating the second slat partially deployed with the first and second slats interlocked.
Figure 19:
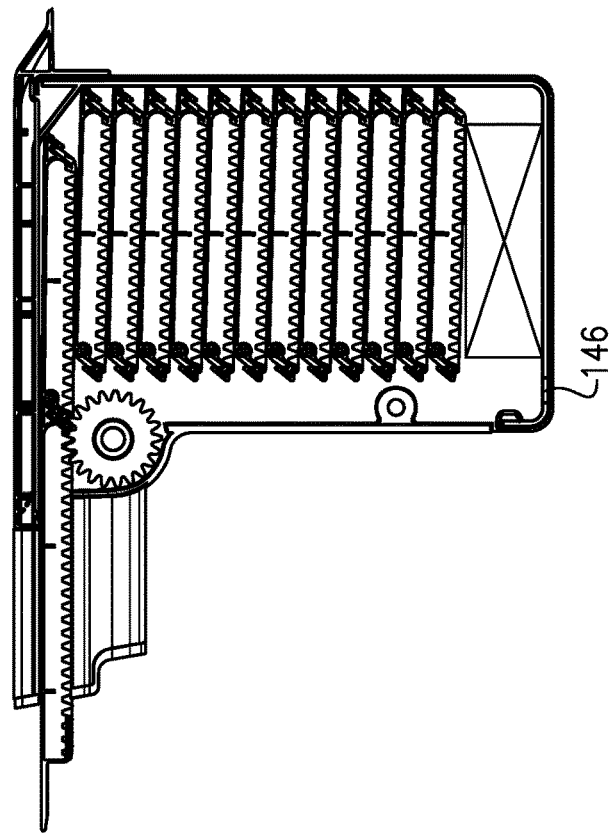
FIG. 19 is a cross-sectional view through the magazine illustrating the first and second slats fully interlocked with one another.

Referring to FIGS. 8 and 9, a T-shaped magazine locator 62 is provided on one end of each guide rail 24 (via first end cap 72) to facilitate alignment of the magazine 28 relative to the guide rails 24 upon reinstallation of the magazine 28 into the truck bed 12. The magazine locator 62 is tapered and cooperates with a complementary shaped recess 64 in the housing 46 (via second end cap 74).

The second locking mechanism 38 is provided on each guide rail 24, one of which is shown in FIGS. 10-12B. The second locking mechanism 38 includes an aperture 66 that receives a lever 68 movable between a locked position (FIGS. 12A and 12B) and a released position (FIGS. 11A and 11B). For security, the lever 68 is arranged interiorly and beneath the track 22 so that the second locking mechanism 38 is inaccessible from outside of the cover 26 when closed.

First and second end caps 72, 74 are mounted in ends of the guide rail 24 and the housing 46, respectively. A pin 70 is secured to the lever 68 and is supported at opposing ends by a guide block 80 and a first hole 76 in the first end cap 72. The second locking mechanism 38 is moved from the released position (FIGS. 11A and 11B) to the locked position (FIGS. 12A and 12B) by sliding the lever 68 toward the magazine 28. The pin 70 is received in a second hole 78 in the second end cap 74 in the locked position, preventing the magazine 28 from being lifted upward.

The first and second locking mechanisms 36, 38 secure the magazine 28 to the truck bed 12, directly and indirectly. The magazine locator 62, recess 64 and second locking mechanism cooperate to locate the guide rails 24 and magazine 28 relative to one another in the X-, Y- and Z-directions.

Referring to FIGS. 13A and 13B, the slats 30 may be constructed of a body 30a formed by a plastic or aluminum extrusion having an interior passage 86 that provides a lighter weight structure. Ends 30b each include a protrusion 84 that is inserted into the interior passage 86 on opposing sides of the body 30a (only one side shown). The slats 30 may also be molded or cast, for example, if desired. Each end 30b has teeth 90, which are provided on a surface 92 arranged on an underside of the slat 30. As can be appreciated, any suitable slat profile and shape may be used. Additionally, the ends 30b may instead have teeth provided at the lateral extremity or elsewhere rather than an underside of the end 30b.

Returning to FIGS. 8 and 10, in one example, the guide rails 24 include a shaped feature that cooperates with a correspondingly shaped feature in the slat 30 to laterally locate the slat 30 within the track 22. An insert or coating may be provided on the track 22 to reduce friction and wear between the slats 30 and the guide rails 24. The track 22 provides a channel 88 used to collect water that can be drained through a drain hole (not shown).

Referring to FIGS. 14-16C, a drive assembly 95 cooperates with the teeth 90 on ends 30b of the slats 30 to extend and retract the cover 26. The tonneau cover may also be opened and closed manually, if desired, with or without a power drive option. In one example, the drive assembly 95 includes an electric motor 96 that drives a shaft 98 (FIG. 5) via a gear train 97, which has driven gears 97a mounted on opposing sides of the shaft 98. Each driven gear 97a cooperates with teeth 90 of the slats 30 to slide the slats 30 along the track 22 in the guide rails 24 and the magazine 28.

In the example, the motor 96 is mounted to a magazine 28, which houses the slats 30, in a generally vertical orientation. The motor 96, which may be powered by the vehicle's battery, rotationally drives a gear train having a drive gear 97c that is coupled to the driven gear 97a via an idler gear 97b. The driven gear 97a cooperates with the slats 30 to extend and retract the slats 30 along the guide rails 24. In one example gear train and motor configuration, the gears and motor cannot be back-driven by pushing or pulling the slats 30, effectively locking the slats 30 in place once power to the motor 96 has been cut.

It is desirable to retract the tonneau cover in the event of a power failure to the motor 96. Moreover, it is desirable to be able to release the tonneau cover, particularly when rigid slats 30 are used, to provide an anti-entrapment feature if a person becomes trapped within the truck bed with the tailgate up and the tonneau cover fully closed. The disclosed release mechanism 100 provides an assembly and apparatus for releasing the tonneau cover.

The release mechanism 100 includes a handle 102 mounted to one of the guide rails 24 by a bracket 103. In one example, the handle 102 is glow-in-the-dark. A finger cup may be provided in the guide rail 24 so that the user can brace themselves with one hand in the finger cup while using the other hand to pull the handle 102. The handle 102 may be manipulated by a user to decouple the motor 96 from the slats 30 so that the slats 30 can be extended and retracted from and to the magazine 28 to close and open the tonneau cover without providing power to the motor 96.

A link 104 includes first and second pivots 106, 108 that are respectively coaxial with the driven gear 97a and the idler gear 97b, which is carried by a link 104. An arm 110 is supported by a third pivot 112. Elongated first and second apertures 114, 116 are provided on the arm 110 on either side of the third pivot 112. A pin 118 is supported at one end of the link 104 opposite the first pivot 106. The pin 118 extends through the first aperture 114.

A pulley 122 is supported on the guide rail 24, and a cable 120 has one end connected to the handle 102 and is wrapped about the pulley 122.

First and second rods 124, 126 are respectively provided in the guide rail 24 and the magazine 28. The first and second rods 124, 126 are normally spaced apart from one another during normal operation in which the motor is powered to move the slats 30. The first and second rods 124, 126 cooperate respectively with first and second springs 128, 130 to bias the first and second rods 124, 126 apart from one another. The second rod 124 includes a carrier 132 which provides a projection 134 that is received within the second aperture 116. The two-piece rod arrangement enables the guide rail 24 and magazine 28 to be connected and disconnected for ease of assembly and disassembly of the electric tonneau cover.

When the release mechanism 100 is actuated by the handle 102, the first rod 124 translates to engage the second rod 126, rotating the arm 110 about the third pivot 112, which causes the pin 118 to engage one end of the first aperture 114 forcing the link 104 to rotate about the first pivot 106 thereby decoupling the idler gear 97b from the drive gear 97c. In this manner, the motor 97c is decoupled from the slats 30 enabling the slats to be manually moved along the guide rails 24.

The bracket 103 includes a pocket that receives an inner end 136 of the handle 102 in a normal position. When the handle is pulled and rotated slightly, the inner end 136 abuts a surface 138 of the bracket 103, which overcomes the biasing forces of the first and second springs 128, 130 and maintains the release mechanism 100 in a disengaged position. Once the inner end 136 of the handle 102 is returned to the pocket of the bracket 103, the first and second rods 124, 126 separate and the biasing force of the second spring 130 rotates the arm 110, and in turn the link 104, back to the normal position, which reengages the idler gear 97b with the drive gear 97c.

Referring to FIGS. 17-21, the cavity 42 of the magazine 28 stores any slats 30 that have not been deployed. In the example, the magazine 28 includes one or more springs 142 supported by the floor of the housing 46 and secured by retainers 144 (FIG. 5). The springs 142 may be provided by a pair of leaf springs in the example, which bias the slats 30 upward. A drain hole 146 may be provided in the magazine 28 to drain water.

In the example, the endmost slat 30 may be larger than the other slats 30 and may include a lip 140 that overlaps the end tailgate 18 with the cover 26 closed (FIG. 1).

The slats 30 are shown fully stowed within the magazine 28 in FIG. 17. As appreciated from FIG. 18, as the slats 30 are deployed from the magazine 28, the uppermost slat within the cavity 42 is biased upward and into interlocking engagement with the next slat, which is arranged in the guide rail 24. Each slat 30 includes first and second profiles 150, 152 opposite one another that provide a complementary interlocking shape, which also permits easy decoupling when the slats 30 are loaded back into the magazine 28.

Weather seals 158 may be located in a lateral groove 156 in each slat 30 at the second profile 152 to seal between the slats 30, as shown in FIG. 21B. To better feed the slats 30 into and out of the magazine 28 during retracting and extending of the cover, a ramped surface 154 is provided to slightly cant the slats 30. During stowage (FIGS. 21A and 21B), as the slat 30 moves into in the cavity 42 the first profile 150 (on the side of the slat 30 farthest from the track 22) will engage the ramped surface 154 in the housing 46 thereby forcing one side down and breaking the engagement between the first and second profiles 150, 152 (best shown in FIG. 21B). Such a configuration reduces noise and lowers the operating forces for the drive assembly 95.

Returning to FIG. 5, the motor 96 communicates with a controller 160 that receives commands from an input 162, such as a two-way switch, to open and close the cover 26. A key fob/remote or other input may be used to open or close the cover 26. The controller 160 can provide a variety of functionality, for example, the controller 160 may be configured to detect an obstruction to the cover 26 within the truck bed 12. The controller 160 commands the motor 96 to open the cover 26 in response to detecting the obstruction. In another example, the controller 160 may be programmed to open/close the cover 26 to a predetermined position, for example, fully opened or fully closed.

It is desirable to provide weather seals between various components to prevent debris from interfering with operation of the tonneau cover and prevent water from entering the truck bed when the tonneau cover is closed. To this end, weather resistant seals are provided between the guide rails 24 and the truck bed lateral sides 14. Additional weather resistant seals between the guide rails 24 and slats 30 may also be used. A water drainage system from guide rails 24 through hole in truck bed front wall 16 may also be provided.

A heating element may be incorporated into each of the guide rails 24 to melt any ice that may prevent slaps 30 from sliding in the guide rails 24. The controller 160 may be used to automatically energize the heating elements when the temperatures reach freezing.

Solar panels may be provided on one or more of the slats 30 to power lights that illuminate the truck bed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A retractable cover system comprising:
    laterally spaced apart guide rails each providing a track;
    a drive assembly includes a motor; and
    a cover has multiple slats configured to interlock with one another in a deployed configuration, all of the slats of the cover each have an outer surface and an inner surface, the outer surfaces provide one side of the cover in the deployed configuration, and the inner surfaces providing another side of the cover in the deployed position, the slats slidable in the tracks between first and second positions within an opening in response to actuation of the motor, the slats stacked onto one another in a stowed configuration, wherein all of the outer surfaces face one direction, and all of the inner surface face another direction opposite the one direction.

2. The retractable cover system according to claim 1, wherein the slats include laterally extending profiles that are complementary to one another and are configured to interlock with one another in a deployed configuration, and the complementary profiles are configured to decouple from one another in the stowed position.

3. The retractable cover system according to claim 1, comprising a magazine housing the slats in the stowed configuration, the magazine configured to be arranged in a truck bed, and comprising at least one of first and second locking mechanisms, the first locking mechanism configured to selectively lock the magazine to the truck bed, and the second locking mechanism configured to selectively lock the magazine to the guide rails.

4. The retractable cover system according to claim 3, wherein the magazine includes a floor supporting a spring biasing the slats upward toward the tracks.

5. The retractable cover system according to claim 4, wherein the spring is a pair of leaf springs arranged between the floor and the bottommost slat.

6. The retractable cover system according to claim 1, comprising a release mechanism that cooperates with the drive assembly, wherein the cover is configured to operate manually with the release mechanism in a disengaged position.

7. The retractable system of claim 6, wherein the release mechanism includes a handle operatively connected to a link that supports a first gear of gear train, the release mechanism configured to rotate the first gear out of engagement with a second gear in response to an input from the handle.

8. The retractable cover system according to claim 1, wherein the motor is operatively connected to a gear, and the gear cooperates with the slats to move the slats between the deployed and stowed configurations.

9. The retractable cover system according to claim 8, wherein each slat includes an end with teeth that cooperate with the gear.

10. The retractable cover system according to claim 9, wherein the teeth are arranged on an underside of the end.

11. A retractable cover system comprising:
    laterally spaced apart guide rails each providing a track;
    a drive assembly includes a motor operatively connected to a gear;

a cover has multiple slats configured to interlock with one another in a deployed configuration, the slats cooperating with the gear and slidable in the tracks between first and second positions within an opening in response to actuation of the drive system, the slats stacked onto one another in a stowed configuration;

a release mechanism that cooperates with the drive assembly, wherein the cover is configured to operate manually with the release mechanism in a disengaged position, wherein the release mechanism includes a handle operatively connected to a link that supports a first gear of a gear train, the release mechanism configured to rotate the first gear out of engagement with a second gear in response to an input from the handle; and a magazine configured to house multiple rigid slats in the retracted position, wherein the release mechanism includes first and second rods respectively supported by the guide rail and the magazine, the first and second rods spaced from one another during normal operation of the cover by the motor, and the first and second rods configured to engage one another in response to the input.

12. The retractable system of claim 11, wherein the release mechanism includes an arm that rotatably cooperates with the link in response to translation of the second rod.

13. The retractable system of claim 11, wherein first and second springs respectively cooperate with the first and second rods to bias the rods apart from one another and the first and second gears into engagement during normal operation.

14. A retractable cover system comprising:

laterally spaced apart guide rails each providing a track;

a drive assembly includes a motor; and a cover has multiple slats configured to interlock with one another in a deployed configuration, all of the slats of the cover each have an aft edge and a forward edge, the aft edge of one slat interlocking with the forward edge of an adjacent slat in the deployed position, the slats slidable in the tracks between first and second positions within an opening in response to actuation of the motor, the slats stacked onto one another in a stowed configuration, wherein all the forward edges are arranged on one side of the stack of slats in the stowed configuration, and all of the aft edges are arranged on another side of the stack of slats in the stowed configuration, the one side opposite the other side.

15. The retractable cover system according to claim 14, wherein the motor is operatively connected to a gear, and the gear cooperates with the slats to move the slats between the deployed and stowed configurations.

\* \* \* \* \*

UNITED STATES PATENT AND TRADEMARK OFFICE
CERTIFICATE OF CORRECTION

| | |
|---|---|
| PATENT NO. | : 10,525,804 B2 |
| APPLICATION NO. | : 16/293156 |
| DATED | : January 7, 2020 |
| INVENTOR(S) | : William P. Pompili et al. |

It is certified that error appears in the above-identified patent and that said Letters Patent is hereby corrected as shown below:

In the Claims

In Claim 1, Column 8, Line 17-18; replace "deployed position" with --deployed configuration--

In Claim 1, Column 8, Line 22-23; replace "inner surface" with --inner surfaces--

In Claim 2, Column 8, Line 28; replace "a deployed configuration" with --the deployed configuration--

In Claim 7, Column 8, Line 52; replace "first gear of gear train" with --first gear of a gear train--

In Claim 14, Column 10, Line 13; replace "deployed position" with --deployed configuration--

Signed and Sealed this
First Day of March, 2022

Drew Hirshfeld
*Performing the Functions and Duties of the
Under Secretary of Commerce for Intellectual Property and
Director of the United States Patent and Trademark Office*